US012771114B2

(12) United States Patent

Iwaki et al.

(10) Patent No.: US 12,771,114 B2

(45) Date of Patent: Oct. 20, 2026

(54) DC SHORT CIRCUIT PROTECTION DEVICE

(71) Applicant: Panasonic Intellectual Property Management Co., Ltd., Osaka (JP)

(72) Inventors: Hideki Iwaki, Osaka (JP); Eiichi Sadayuki, Osaka (JP); Tomoaki Furuse, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 139 days.

(21) Appl. No.: 18/868,216

(22) PCT Filed: May 29, 2023

(86) PCT No.: PCT/JP2023/019838

§ 371 (c)(1),
(2) Date: Nov. 22, 2024

(87) PCT Pub. No.: WO2023/238714

PCT Pub. Date: Dec. 14, 2023

(65) Prior Publication Data

US 2026/0005506 A1 Jan. 1, 2026

(30) Foreign Application Priority Data

Jun. 7, 2022 (JP) ................................. 2022-092472

(51) Int. Cl.
*H02H 3/087* (2006.01)

(52) U.S. Cl.
CPC .................................. *H02H 3/087* (2013.01)

(58) Field of Classification Search
CPC ................ H02H 3/087; H01H 71/125; H01H 2085/0266; H01H 39/006
See application file for complete search history.

(56) References Cited

U.S. PATENT DOCUMENTS 3,604,356 A * 9/1971 Browning, Jr. ......... F42C 11/06 102/262
4,224,487 A * 9/1980 Simonsen ............ H01H 39/006 200/61.08

(Continued)

FOREIGN PATENT DOCUMENTS

| | | |
|---|---|---|
| EP | 3648292 B1 | 5/2022 |
| JP | 2011-059001 A | 3/2011 |
| JP | 2020-136055 | 8/2020 |

OTHER PUBLICATIONS

The EPC Office Action dated Sep. 9, 2025 for the related European Patent Application No. 23819696.8.

(Continued)

*Primary Examiner* — Thienvu V Tran
*Assistant Examiner* — Muaamar Qahtan Al-Taweel
(74) *Attorney, Agent, or Firm* — GREENBLUM & BERNSTEIN, P.L.C.

(57) ABSTRACT

A direct current short circuit protection device includes a fuse that includes a bus bar and cuts off the bus bar in response to an ignition signal, a first current detector that includes a first resistor and detects a current flowing through the bus bar, a second current detector that includes a second resistor and detects the current flowing through the bus bar, and a disconnection control circuit that outputs the ignition signal to the fuse based on a first detection signal output from the first current detector and a second detection signal output from the second current detector, wherein the first resistor and the second resistor are integrated with the bus bar, and a current having a same magnitude as the current flowing through the bus bar flows in the first resistor and the second resistor, and the first resistor and second resistor have resistance values different from each other.

20 Claims, 5 Drawing Sheets

(56) References Cited

U.S. PATENT DOCUMENTS

| | | | | |
|---|---|---|---|---|
| 7,241,959 | B1 * | 7/2007 | Lin | H01H 35/14<br>200/61.08 |
| 8,432,246 | B2 * | 4/2013 | Suzuki | B60L 3/04<br>361/115 |
| 9,953,783 | B2 * | 4/2018 | Fellmer | H01H 39/006 |
| 2005/0083164 | A1 * | 4/2005 | Caruso | H01H 39/006<br>337/159 |
| 2010/0328014 | A1 * | 12/2010 | Suzuki | H01H 39/006<br>337/30 |
| 2022/0139653 | A1 | 5/2022 | Sakai et al. | |

OTHER PUBLICATIONS

International Search Report of PCT application No. PCT/JP2023/019838 dated Jul. 18, 2023.

* cited by examiner

DC SHORT CIRCUIT PROTECTION DEVICE

CROSS-REFERENCE TO RELATED APPLICATIONS

This application is a U.S. national stage application of the PCT International Application No. PCT/JP2023/019838 filed on May 29, 2023, which claims the benefit of foreign priority of Japanese patent application No. 2022-092472 filed on Jun. 7, 2022, the contents all of which are incorporated herein by reference.

TECHNICAL FIELD

The present disclosure relates to a direct current short circuit protection device.

BACKGROUND ART

PTL 1 describes a technology for downsizing an electric circuit breaker device by integrating a sensor for current detection with the electric circuit breaker device.

CITATION LIST

Patent Literature

PTL 1: Unexamined Japanese Patent Publication No. 2020-136055

SUMMARY OF THE INVENTION

However, in the electric circuit breaker device described in PTL 1, when there is a large change in the flowing current because of noise or the like, a counter-electromotive voltage ($V=-L\times di/dt$) is generated because of the influence of an inductance component in a sensor (shunt resistor) for current detection. The current value is detected to be larger than the original value because of the counter-electromotive voltage, and erroneous disconnection may occur.

The present disclosure provides a direct current short circuit protection device capable of suppressing erroneous disconnection due to the influence of an inductance component.

A direct current short circuit protection device according to one embodiment of the present disclosure includes a fuse that includes a bus bar and cuts off the bus bar in response to an ignition signal, a first current detector that includes a first resistor and detects a current flowing through the bus bar, a second current detector that includes a second resistor and detects the current flowing through the bus bar, and a disconnection control circuit that outputs the ignition signal to the fuse based on a first detection signal output from the first current detector and a second detection signal output from the second current detector, wherein the first resistor and the second resistor are integrated with the bus bar, and a current having a same magnitude as the current flowing through the bus bar flows in the first resistor and the second resistor, and the first resistor and second resistor have resistance values different from each other.

The direct current short circuit protection device according to one aspect of the present disclosure can suppress erroneous disconnection due to an influence of an inductance component.

DESCRIPTION OF EMBODIMENT

Hereinafter, an exemplary embodiment is specifically described with reference to the drawings.

The exemplary embodiments described below illustrate comprehensive or specific examples. Numerical values, shapes, materials, constituent elements, disposition positions and connection forms of the constituent elements, and the like described in the following exemplary embodiments are illustrative, and are not intended to limit the scope of the present disclosure.

Exemplary Embodiment

Direct current short circuit protection device 1 according to an exemplary embodiment will be described with reference to FIG. 1.

Figure 1:
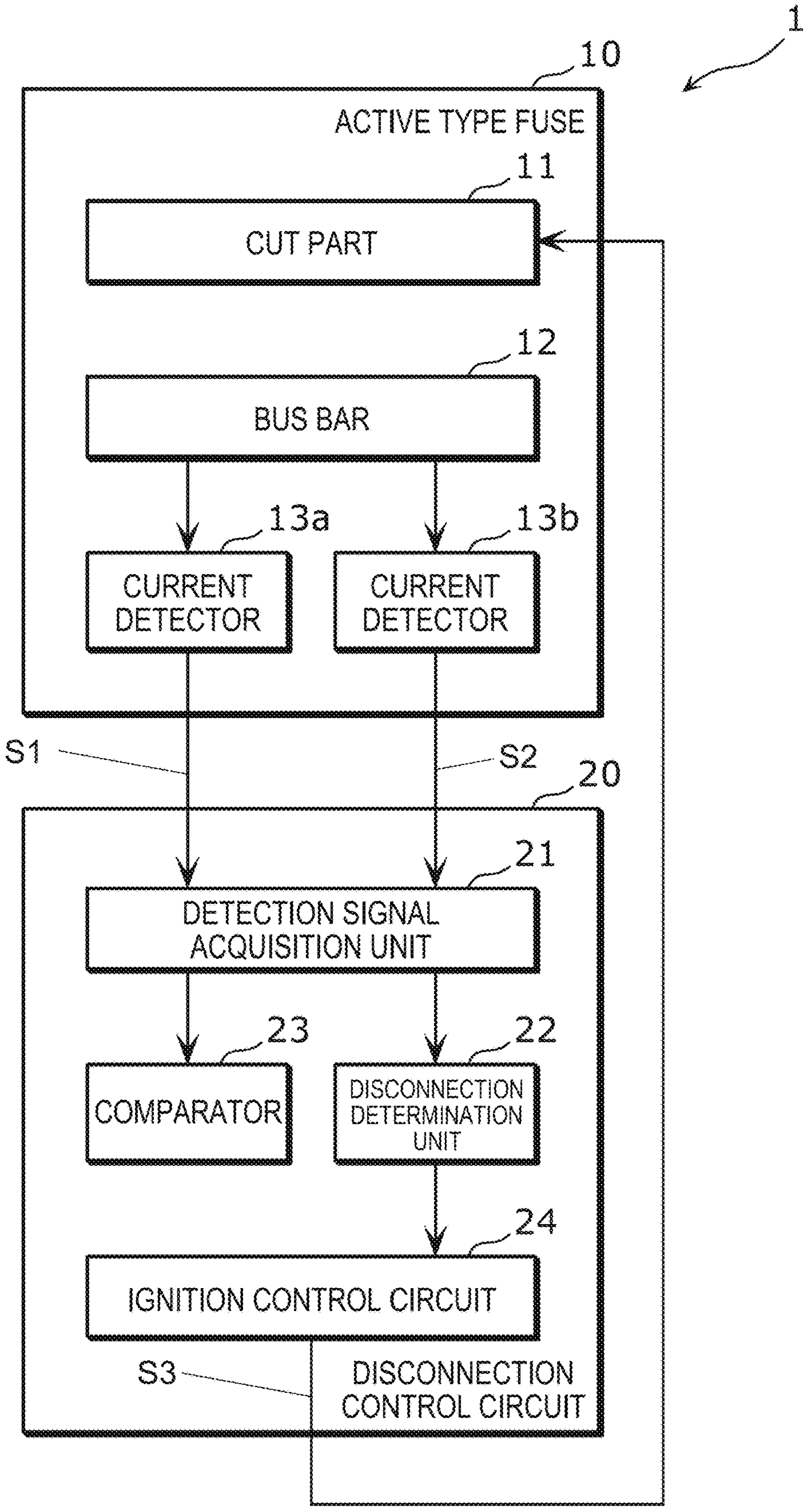
FIG. 1 is a block diagram illustrating an example of a direct current short circuit protection device according to an exemplary embodiment.

FIG. 1 is a block diagram illustrating an example of direct current short circuit protection device 1 according to an exemplary embodiment.

Direct current short circuit protection device 1 is mounted on, for example, a vehicle such as an electric automobile that uses electric power for propulsion drive. A high-voltage battery is mounted on the vehicle such as an electric automobile, and electric power is supplied from the battery to a load such as a motor to propel and drive the vehicle such as the electric automobile. When an accident or the like has occurred, a large current due to a short circuit anomaly may flow in a path connecting the battery and the load, and the battery may smoke or fire. Thus, direct current short circuit protection device 1 is provided to disconnect the path.

Direct current short circuit protection device 1 includes active type fuse 10 and disconnection control circuit 20.

Active type fuse 10 is a device for cutting a path connecting the battery and the load when a large current due to a short circuit anomaly flows in the path, and is, for example, a pyrofuse. The pyrofuse incorporates gunpowder therein, and when the gunpowder is ignited based on a control signal from the outside, a bus bar is irreversibly cut by an explosive force due to ignition of the gunpowder, which disconnects the current. Active type fuse 10 includes cutter 11, bus bar 12, and a plurality of current detectors. Here, two current detectors 13*a* and 13*b* are illustrated as the plurality of current detectors, but the plurality of current detectors may be three or more. When the number of current detectors is large, it is necessary to process the detection signal of each current detector, and the processing load increases. Thus, in the present specification, an example in which the plurality of current detectors is not four or more but two or three will be described.

Bus bar 12 is an elongated conductor rod that is connected (for example, fastened) to the path connecting the battery and the load and becomes a part of the path. Cutter 11 cuts off bus bar 12 based on an ignition signal from disconnection control circuit 20. Since bus bar 12 is a part of the path, the path can be disconnected by cutting bus bar 12.

Figure 2:
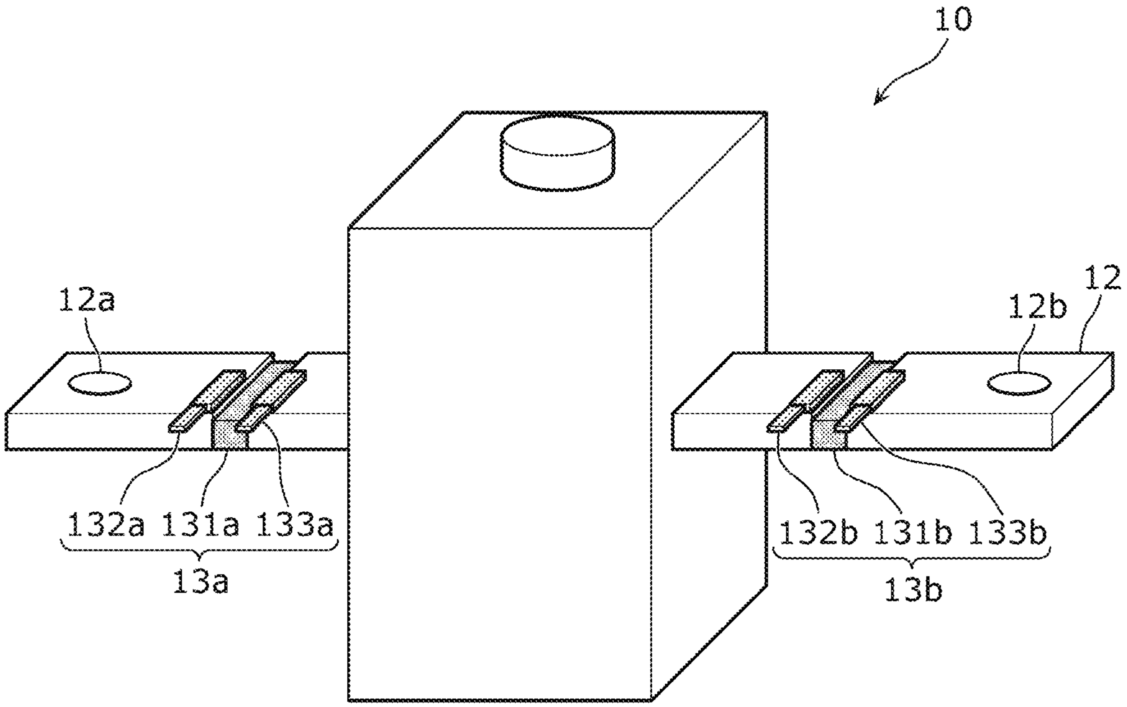
FIG. 2 is a perspective view of an active type fuse in a first example.

FIG. 2 is a perspective view of an example of active type fuse 10. As illustrated in FIG. 2, current detector 13*a* is a current sensor that includes resistor 131*a* and detects a current flowing through bus bar 12. Current detector 13*a* is an example of a first current detector. Resistor 131*a* is an example of a first resistor. Current detector 13*b* is a current sensor that includes resistor 131*b* and detects a current flowing through bus bar 12. Current detector 13*b* is an example of a second current detector. Resistor 131*b* is an example of a second resistor. Resistors 131*a* and 131*b* are integrated with bus bar 12 so that a current having the same magnitude as the current flowing through bus bar 12 flows. An example of the integration will be described later. Current detector 13*a* detects the current flowing through bus bar 12 by converting the current flowing through resistor 131*a* into voltage. Current detector 13*b* detects the current flowing through bus bar 12 by converting the current flowing through resistor 131*b* into voltage.

Disconnection control circuit 20 is connected to active type fuse 10 and controls active type fuse 10 to cut bus bar 12. Specifically, disconnection control circuit 20 outputs ignition signal S3 to active type fuse 10 based on detection signal S1 output from current detector 13*a* and detection signal S2 output from current detector 13*b*. When ignition signal S3 is input, cutter 11 cuts off bus bar 12. Disconnection control circuit 20 is realized by, for example, a micro controller unit (MCU) or the like. Disconnection control circuit 20 includes detection signal acquisition unit 21, disconnection determination unit 22, comparator 23, and ignition control circuit 24.

Detection signal acquisition unit 21 acquires detection signal S1 output from current detector 13*a* and detection signal S2 output from current detector 13*b*. For example, detection signal S1 is a signal indicating a voltage generated when a current flows through resistor 131*a* included in current detector 13*a*, and detection signal S2 is a signal indicating a voltage generated when a current flows through resistor 131*b* included in current detector 13*b*.

Disconnection determination unit 22 determines whether to disconnect the path connecting the battery and the load based on detection signal S1 output from current detector 13*a* and detection signal S2 and output from current detector 13*b*. For example, disconnection determination unit 22 determines whether cutting off of bus bar 12 is executable by performing a predetermined calculation based on detection signal S1 output from current detector 13*a* and detection signal S2 output from current detector 13*b*. Details of the predetermined calculation will be described later.

Comparator 23 compares the first current value calculated based on detection signal S1 output from current detector 13*a* with the second current value calculated based on detection signal S2 output from current detector 13*b*. Specifically, comparator 23 calculates the first current value by dividing the voltage indicated by detection signal S1 output from current detector 13*a* by the resistance value of resistor 131*a*, and calculates the second current value by dividing the voltage indicated by detection signal S2 output from current detector 13*b* by the resistance value of resistor 131*b*. Comparator 23 performs failure detection on current detectors 13*a* and 13*b* based on a comparison result between the first current value and the second current value. For example, when the first current value and the second current value are different from each other, comparator 23 determines that any one of current detectors 13*a* and 13*b* has failed. For example, when any one of current detectors 13*a* and 13*b* has failed, disconnection control circuit 20 may notify an external device of the failure.

Ignition control circuit 24 outputs ignition signal S3 to active type fuse 10 when disconnection determination unit 22 determines that cutting off of bus bar 12 is executable. With this configuration, when a large current due to a short-circuit anomaly flows in the path, active type fuse 10 cuts off bus bar 12, and the path can be cut off.

There are various forms of direct current short circuit protection device 1, and first to fifth examples will be described below.

First Example

First, a first example of direct current short circuit protection device 1 will be described with reference to FIGS. 2 and 3.

FIG. 2 is a perspective view of active type fuse 10 in the first example.

Figure 3:
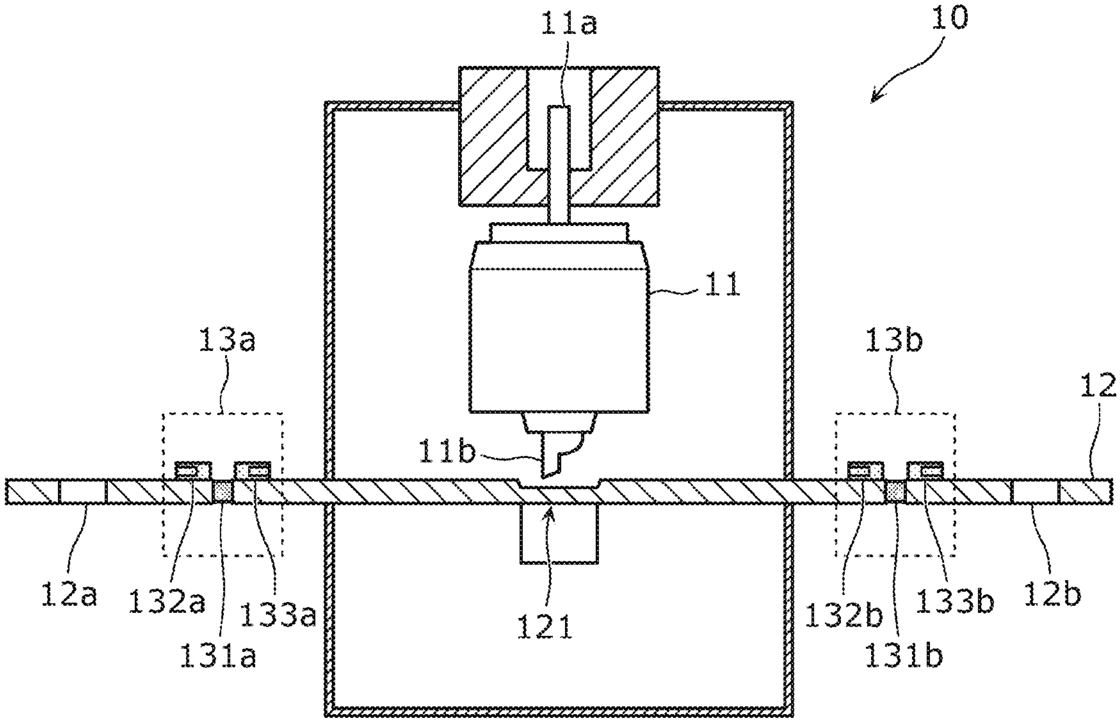
FIG. 3 is a partial sectional view of the active type fuse in the first example.

FIG. 3 is a partial sectional view of active type fuse 10 in the first example. In FIG. 3, illustration of a section of cutter 11 is omitted.

Cutter 11 includes, for example, ignition terminal 11*a* and cutting blade 11*b*. Ignition terminal 11*a* is connected to ignition control circuit 24 of disconnection control circuit 20. When ignition signal S3 (see FIG. 1) is output from ignition control circuit 24 to ignition terminal 11*a*, cutter 11 instantaneously pushes down cutting blade 11*b* downward to cut bus bar 12.

For example, bus bar 12 is provided with fastener part 12*a* at one end in the longitudinal direction of bus bar 12, and is provided with fastener part 12*b* at the other end in the longitudinal direction of bus bar 12. Bus bar 12 is inserted in the middle of the path connecting the battery and the load, and fastener parts 12*a* and 12*b* are fastened to the path with screws or the like. Bus bar 12 thus becomes a part of the path. Cut portion 121 of bus bar 12 is a portion cut by cutting blade 11*b* of cutter 11 when ignition signal S3 is output from disconnection control circuit 20.

In the present disclosure, the resistance value of resistor 131*a* included in current detector 13*a* is different from the resistance value of resistor 131*b* included in current detector 13*b*. For example, resistors 131*a* and 131*b* are resistance elements (shunt resistors) of about several 10 microhms. As illustrated in FIGS. 2 and 3, resistors 131*a* and 131*b* are integrated with bus bar 12 by being inserted into bus bar 12. In a fourth example and a fifth example to be described later, an example will be described in which resistors 131*a* and 131*b* are not resistance elements but parts of bus bar 12, and are integrated with bus bar 12 as parts of bus bar 12. In resistors 131*a* and 131*b* integrated with bus bar 12, the current flowing through bus bar 12 is converted into a voltage, whereby the current flowing through bus bar 12 can be detected.

In the first example, current detector 13*a* includes two current monitoring terminals 132*a* and 133*a* for monitoring the current flowing through resistor 131*a*, and current monitoring terminals 132*a* and 133*a* are provided on bus bar 12 such that resistor 131*a* is positioned between current monitoring terminals 132*a* and 133*a*. Current detector 13*b* includes two current monitoring terminals 132*b* and 133*b* for monitoring the current flowing through resistor 131*b*, and current monitoring terminals 132*b* and 133*b* are provided on bus bar 12 such that resistor 131*b* is positioned between current monitoring terminals 132*b* and 133*b*. For example, the distance between current monitoring terminals 132*a* and 133*a* and the distance between current monitoring terminals 132*b* and 133*b* are substantially the same. In other words, the inductance component between current monitoring terminals 132*a* and 133*a* and the inductance component between current monitoring terminals 132*b* and 133*b* are substantially the same.

Current monitoring terminals 132*a*, 133*a*, 132*b*, and 133*b* are connected to detection signal acquisition unit 21 of disconnection control circuit 20. Detection signal acquisition unit 21 acquires, as detection signals, a voltage between current monitoring terminals 132*a* and 133*a*, that is, a voltage generated in resistor 131*a* when a current flows through resistor 131*a*, and a voltage between current monitoring terminals 132*b* and 133*b*, that is, a voltage generated in resistor 131*b* when a current flows through resistor 131*b*.

As described above, disconnection control circuit 20 determines whether cutting off of bus bar 12 is executable by performing a predetermined calculation based on detection signal S1 output from current detector 13*a* and detection signal S2 output from current detector 13*b*. The predetermined calculation includes a calculation of dividing a difference between detection signal S1 output from current detector 13*a* and detection signal S2 output from current detector 13*b* by a difference between a resistance value of resistor 131*a* included in current detector 13*a* and a resistance value of resistor 131*b* included in current detector 13*b*. Although details will be described later, performing such calculation on detection signals S1 and S2 output from current detectors 13*a* and 13*b* respectively including resistors 131*a* and 131*b* having different resistance values can detect the current flowing through bus bar 12 while suppressing erroneous disconnection due to the influence of the inductance component.

Disconnection determination unit 22 determines to cut off the path when the current value based on the result of the predetermined calculation is larger than or equal to a predetermined value, that is, when a large current is flowing through bus bar 12.

Although the first example shows an example in which current detectors 13*a* and 13*b* are provided outside a housing of active type fuse 10, at least one of current detectors 13*a* and 13*b* may be provided inside the housing of active type fuse 10.

Cutter 11 may include a plurality of cutting blades, and bus bar 12 may be cut at a plurality of positions when ignition signal S3 is output from disconnection control circuit 20.

As described above, direct current short circuit protection device 1 includes active type fuse 10 that includes bus bar 12 and cuts off bus bar 12 according to ignition signal S3 (see FIG. 1), current detector 13*a* that includes resistor 131*a* and detects a current flowing through bus bar 12, current detector 13*b* that includes resistor 131*b* and detects the current flowing through bus bar 12, and disconnection control circuit 20 that outputs ignition signal S3 to active type fuse 10 based on detection signal S1 output from current detector 13*a* and detection signal S2 output from current detector 13*b*, wherein resistors 131*a* and 131*b* are integrated with bus bar 12 such that a current having the same magnitude as the current flowing through bus bar 12 flows, and the resistance value of resistor 131*a* and the resistance value of resistor 131*b* are different values.

When there is a large change in the current flowing through bus bar 12 because of noise, sudden acceleration of the vehicle, or the like (that is, when di/dt is large), a large counter-electromotive voltage ($V=-L\times di/dt$) due to the influence of the inductance component (L) in each of resistors 131*a* and 131*b* is generated. Detection signals S1 and S2 output from current detectors 13*a* and 13*b* include such a large counter-electromotive voltage component. Thus, the current value is detected to be larger than the original value because of the counter-electromotive voltage, and erroneous disconnection may occur. However, the resistance values of resistors 131*a* and 131*b* and the inductance components do not have a correspondence relationship, and the counter-electromotive voltage generated in resistor 131*a* and the counter-electromotive voltage generated in resistor 131*b* are substantially the same even when the resistance value of resistor 131*a* and the resistance value of resistor 131*b* are different values. Thus, in the present disclosure, by taking a difference between detection signal S1 output from current detector 13*a* and detection signal S2 output from current detector 13*b*, the component of the counter-electromotive voltage included in each detection signal is canceled. Therefore, erroneous disconnection due to the influence of the inductance component can be suppressed.

When a current flows through bus bar 12, voltages of different magnitudes are generated in resistors 131*a* and 131*b* according to the resistance values. Thus, when the difference between detection signal S1 output from current detector 13*a* and detection signal S2 output from current detector 13*b* is obtained, the component of the voltage generated by the current flowing through bus bar 12 can be left. Therefore, it is possible to detect the current flowing through bus bar 12 while suppressing erroneous disconnection due to the influence of the inductance component.

For example, disconnection control circuit 20 may determine whether cutting off of bus bar 12 is executable by performing a predetermined calculation based on detection signal S1 output from current detector 13*a* and detection signal S2 output from current detector 13*b*, and may output an ignition signal to active type fuse 10 when it is determined that cutting off of bus bar 12 is executable. For example, the predetermined calculation may include a calculation of dividing a difference between detection signal S1 output from current detector 13*a* and detection signal S2 output from current detector 13*b* by a difference between the resistance value of resistor 131*a* and the resistance value of resistor 131*b*.

Accordingly, the difference between detection signal S1 output from current detector 13*a* and detection signal S2 output from current detector 13*b* includes the difference between the voltage generated in resistor 131*a* by the current flowing through bus bar 12 and the voltage generated in resistor 131*b*. Since the difference between detection signal S1 output from current detector 13*a* and detection signal S2 output from current detector 13*b* is a voltage corresponding to the difference between the resistance value of resistor 131*a* and the resistance value of resistor 131*b*, the current flowing through bus bar 12 can be detected by dividing the difference between detection signal S1 output from current detector 13*a* and detection signal S2 output from current detector 13*b* by the difference between the resistance value of resistor 131*a* and the resistance value of resistor 131*b*.

For example, current detector 13*a* may have current monitoring terminals 132*a* and 133*a* for monitoring the current flowing through resistor 131*a*, and current detector 13*b* may have current monitoring terminals 132*b* and 133*b* for monitoring the current flowing through resistor 131*b*.

Current monitoring terminals 132*a*, 133*a*, 132*b*, and 133*b* may be provided in current detectors 13*a* and 13*b* in this manner.

For example, direct current short circuit protection device 1 may further include comparator 23 that compares the first current value based on detection signal S1 output from current detector 13*a* with the second current value based on detection signal S2 output from current detector 13*b*, and comparator 23 may perform failure detection on current detector 13*a* or 13*b* based on the comparison result between the first current value and the second current value.

With this configuration, since currents of the same magnitude flow through resistors 131*a* and 131*b* included in current detectors 13*a* and 13*b*, the first current value and the second current value based on detection signals S1 and S2 output from current detectors 13*a* and 13*b* should be the same, but when any one of current detectors 13*a* and 13*b* has failed, the current values may be different from each other. Thus, when the first current value and the second current value are different from each other, it can be detected that any one of current detectors 13*a* and 13*b* has failed.

Second Example

Next, a second example of direct current short circuit protection device 1 will be described with reference to FIG. 4.

Figure 4:
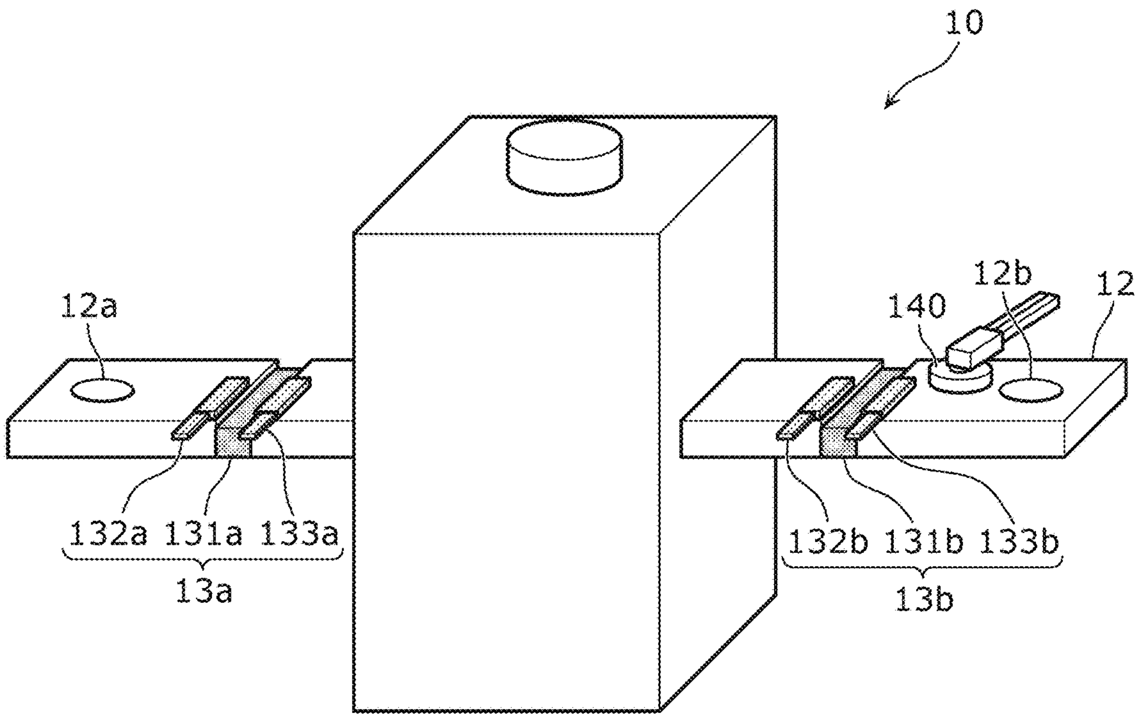
FIG. 4 is a perspective view of an active type fuse in a second example.

FIG. 4 is a perspective view of active type fuse 10 in the second example.

In the second example, bus bar 12 is provided with temperature monitoring terminal 140 for monitoring the temperature of bus bar 12. The other points are the same as those of the first example, and thus the description thereof will be omitted.

A thermistor, a thermocouple, or the like is connected to temperature monitoring terminal 140, and the temperature of bus bar 12 is monitored. The temperature of bus bar 12 is acquired by disconnection control circuit 20 and used for calculating the current value of the current flowing through bus bar 12 in disconnection determination unit 22.

The resistance values of the resistors 131*a* and 131*b* change depending on the temperature, and the voltage generated in the resistors 131*a* and 131*b* change accordingly. Thus, the calculation result of the current flowing through bus bar 12 changes depending on the temperature. Therefore, the temperature of bus bar 12 with which resistors 131*a* and 131*b* are integrated is monitored, and the detection signals of current detectors 13*a* and 13*b* or the calculated current values are corrected according to the temperature of bus bar 12, whereby the current flowing through bus bar 12 can be accurately detected.

Third Example

Next, a third example of direct current short circuit protection device 1 will be described with reference to FIG. 5.

Figure 5:
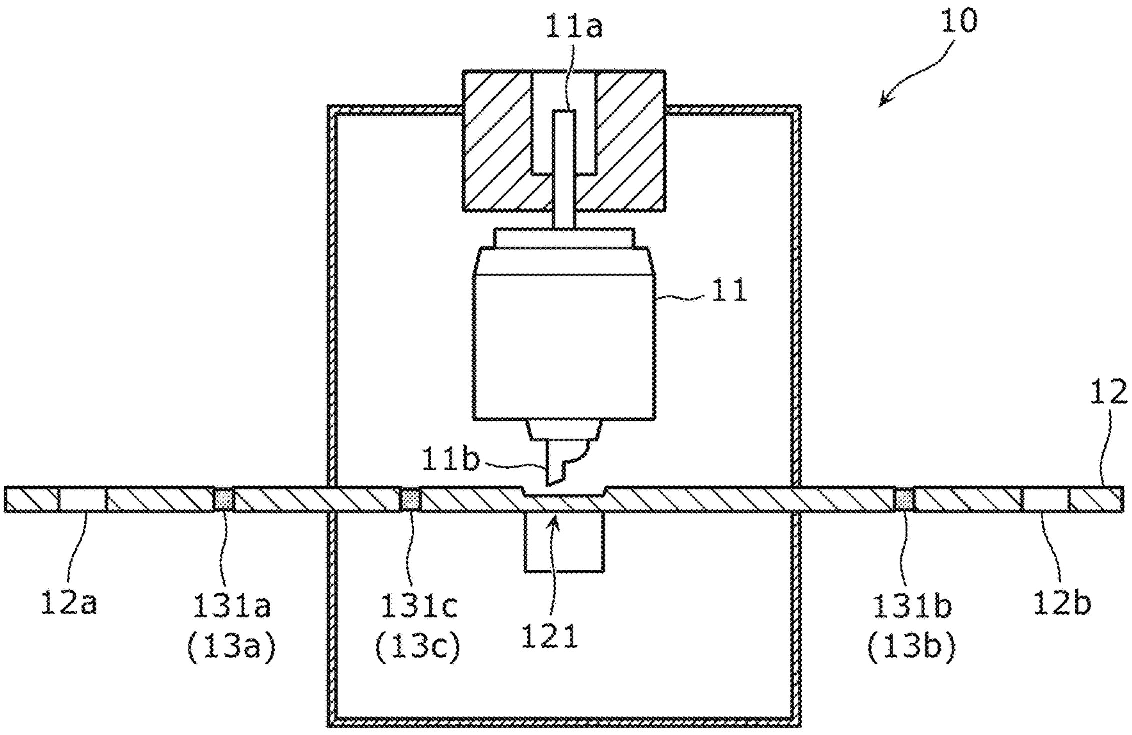
FIG. 5 is a partial sectional view of an active type fuse in a third example.

FIG. 5 is a partial sectional view of active type fuse 10 in the third example. In FIG. 5, illustration of a section of cutter 11 is omitted. In FIG. 5, illustration of the current monitoring terminal is omitted.

In the third example, active type fuse 10 further includes current detector 13*c* (resistor 131*c*). The other points are the same as those of the first example, and thus the description thereof will be omitted.

In the third example, since active type fuse 10 includes three current detectors 13*a* to 13*c*, a failed current detector among the three current detector 13*a* to 13*c* can be specified. Specifically, when the current value based on the detection signal output from one of three current detectors 13*a* to 13*c* is different from the two current values based on the detection signals output from the other two current detectors, it is possible to detect that the one current detector has failed.

FIG. 5 illustrates an example in which current detector 13*c* is provided in the housing of active type fuse 10, but two or more current detectors among the three current detectors 13*a* to 13*c* may be provided in the housing of active type fuse 10, or all the three current detectors may be provided outside the housing of active type fuse 10.

Also in the third example, bus bar 12 may be provided with temperature monitoring terminal 140.

Fourth Example

Next, a fourth example of direct current short circuit protection device 1 will be described with reference to FIGS. 6 to 8.

Figure 6:
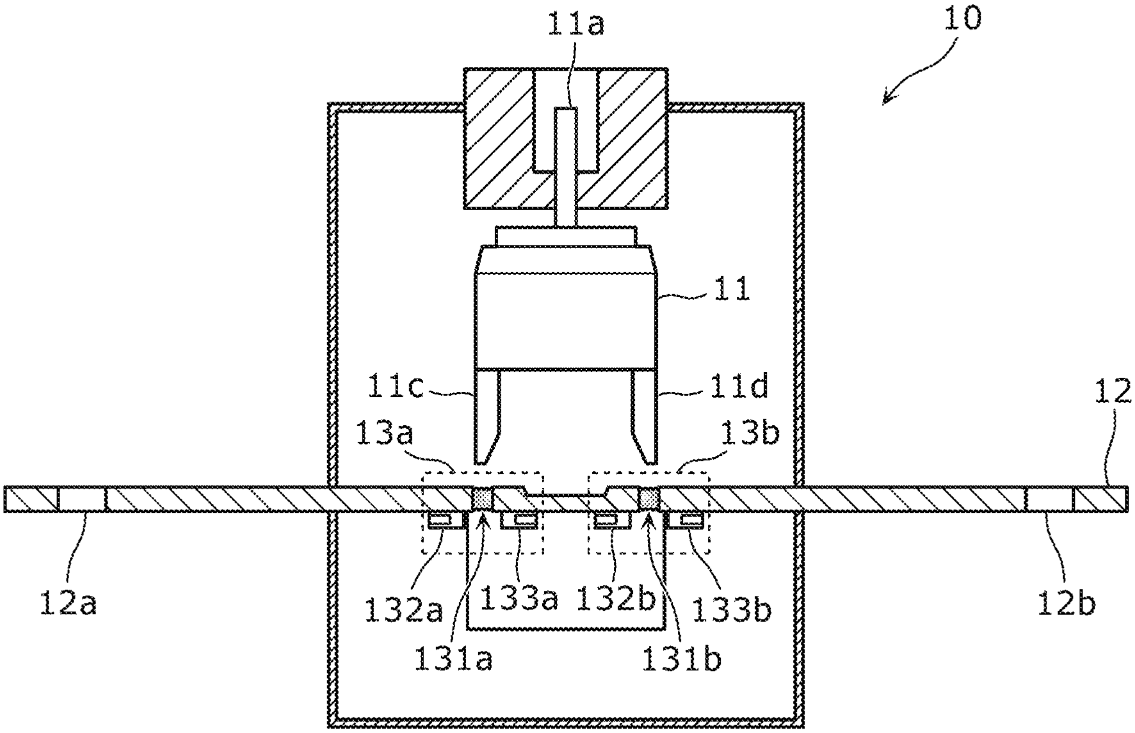
FIG. 6 is a partial sectional view of an active type fuse in a fourth example.

FIG. 6 is a partial sectional view of active type fuse 10 in the fourth example. In FIG. 6, illustration of a section of cutter 11 is omitted.

Figure 7:
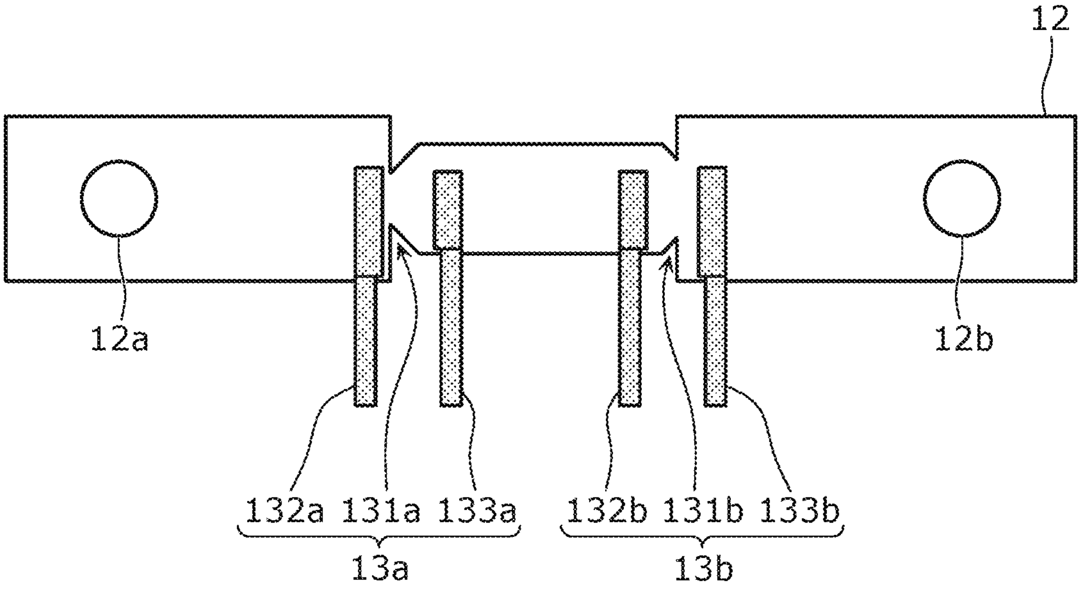
FIG. 7 is a bottom view of a bus bar in the fourth example.

FIG. 7 is a bottom view of bus bar 12 in the fourth example.

Figure 8:
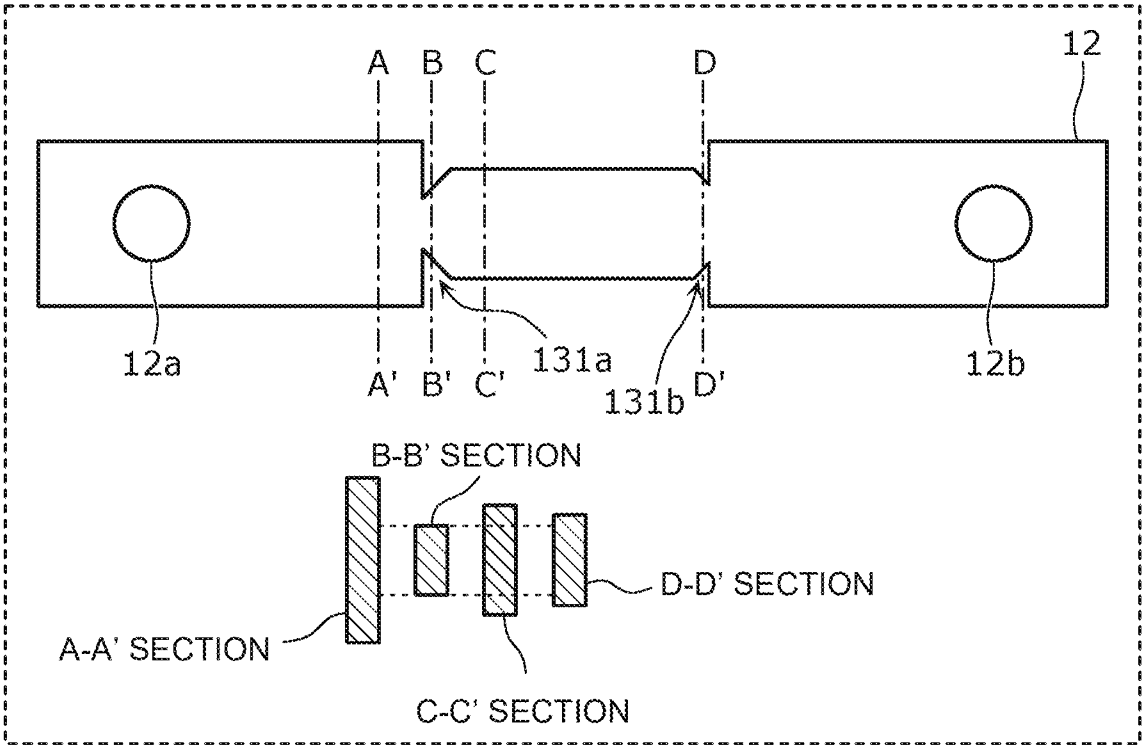
FIG. 8 is a view for describing a sectional structure of the bus bar in the fourth example.

FIG. 8 is a view for describing a sectional structure of bus bar 12 in the fourth example. In FIG. 8, illustration of the current monitoring terminal is omitted.

In the fourth example, resistors 131*a* and 131*b* are parts of bus bar 12, and parts where the resistance value is increased by narrowing or thinning a part of bus bar 12 are used as the resistors 131*a* and 131*b*. Specifically, the area of a section orthogonal to the direction in which the current flows in resistors 131*a* and 131*b* of bus bar 12 is smaller than the area of a section orthogonal to the direction in which the current flows in the portion other than resistors 131*a* and 131*b* of bus bar 12. As illustrated in FIGS. 7 and 8, it can be seen that the area of a section of resistors 131*a* and 131*b* (area of B-B' section and area of D-D' section in FIG. 8) is smaller than the area of a section of the portion other than resistors 131*a* and 131*b* (for example, area of A-A' section and area of C-C' section in FIG. 8). A current monitoring terminal is connected to both ends of the portion with a reduced sectional area so that a voltage generated by a current flowing through the portion can be acquired via the current monitoring terminal, whereby the portion can be used as a current detector.

In the fourth example, the area of a section orthogonal to the direction in which the current flows in resistor 131*a* of bus bar 12 and the area of a section orthogonal to the direction in which the current flows in the portion other than resistor 131*b* of bus bar 12 are different from each other. As a result, even when resistors 131*a* and 131*b* are parts of bus bar 12, the resistance value of resistor 131*a* and the resistance value of resistor 131*b* can be set to different values. For example, as illustrated in FIGS. 7 and 8, it can be seen that the area of a section of resistor 131*a* (area of B-B' section in FIG. 8) is smaller than the area of a section of resistor 131*b* (area of D-D' section in FIG. 8), and the resistance value of resistor 131*a* is larger than the resistance value of resistor 131*b*.

Further, in the fourth example, cutter 11 of active type fuse 10 has two cutting blades 11*c* and 11*d*, and when ignition signal S3 is output from ignition control circuit 24 to ignition terminal 11*a*, cutter 11 instantaneously pushes down cutting blades 11*c* and 11*d* downward to cut bus bar 12. For example, resistors 131*a* and 131*b* are cut portions to be cut by cutter 11.

A cut portion of bus bar 12 to be cut by active type fuse 10 has a smaller sectional area than other portions of bus bar 12 to facilitate cutting (for example, constricted). Thus, the cut portion in bus bar 12 has a higher resistance value than other portions of bus bar 12. Therefore, the cut portions can be used as resistors 131*a* and 131*b* for detecting the current flowing through bus bar 12, and the structure of direct current short circuit protection device 1 can be simplified and the cost can be reduced as compared with a case where a resistor for detecting the current flowing through bus bar 12 is separately prepared.

When the cut portions of bus bar 12 are treated as resistors 131*a* and 131*b*, the resistance value varies depending on dimensional tolerance or the like due to machining accuracy of the cut portions. For this reason, the calibration value for each individual may be stored in a flash memory or the like of disconnection control circuit 20, and the current value may be corrected for each individual using the calibration value.

In the fourth example, active type fuse 10 may further include a current detector. Two or more of the current detectors included in active type fuse 10 may include a current detector in which the resistor is a part of bus bar 12 and a current detector in which the resistor is a resistance element.

In the fourth example, an example in which the cut portions of bus bar 12 are utilized as resistors 131*a* and 131*b* is shown, but a portion that is not the cut portion and has a reduced sectional area may be utilized as the resistor of the current detector.

Also in the fourth example, bus bar 12 may be provided with temperature monitoring terminal 140.

Fifth Example

Next, a fifth example of direct current short circuit protection device 1 will be described with reference to FIG. 9.

Figure 9:
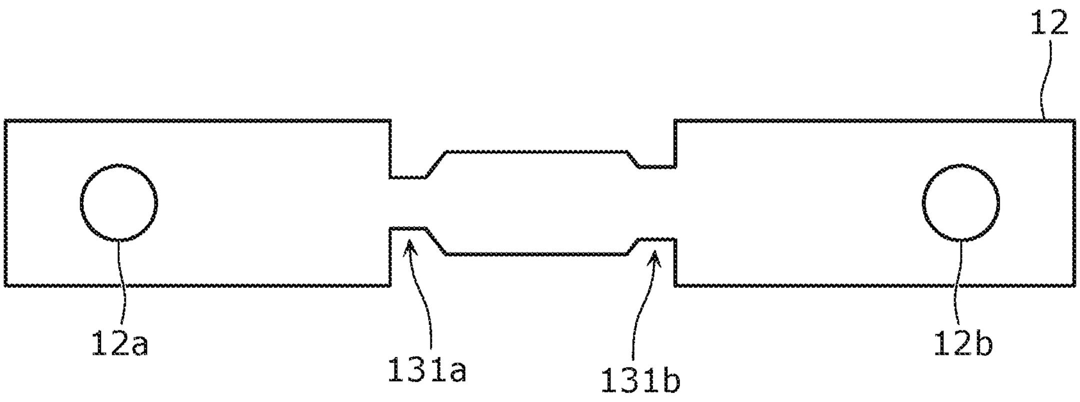
FIG. 9 is a top view of a bus bar in a fifth example.

FIG. 9 is a top view of bus bar 12 in the fifth example. In FIG. 9, illustration of the current monitoring terminal is omitted.

In the fifth example, the shape of the resistor (cut portion) in the bus bar is different from that in the fourth example. The other points are the same as those of the fourth example, and thus the description thereof will be omitted.

When the cut portion of bus bar 12 is treated as a resistor, the resistance value of the resistor varies depending on the dimensional tolerance of the cut portion or the like. However, as illustrated in FIG. 9, the resistor (cut portion) is formed so that a sectional shape is constant by about several millimeters along the direction in which the current flows, whereby the current can be stably detected even through there is a variation in the resistance value due to machining accuracy.

Other Exemplary Embodiments

The exemplary embodiments have been described as examples of the technology according to the present disclosure. However, the technology according to the present disclosure is not limited to these, and can also be applied to exemplary embodiments in which changes, replacements, additions, omissions, and the like are made as appropriate. For example, the following modifications are also included in one exemplary embodiment of the present disclosure.

For example, in the above exemplary embodiment, an example has been described in which direct current short circuit protection device 1 (specifically, disconnection control circuit 20) includes comparator 23. However, direct current short circuit protection device 1 may include no comparator 23.

For example, in the above exemplary embodiment, an example in which direct current short circuit protection device 1 includes disconnection control circuit 20 has been described, but disconnection control circuit 20 does not have to be included in direct current short circuit protection device 1. That is, disconnection control circuit 20 may be provided separately from direct current short circuit protection device 1.

For example, in the above exemplary embodiment, each of current detectors 13*a* and 13*b* has a current monitoring terminal. However, the current monitoring terminal does not have to be a component of current detectors 13*a* and 13*b*.

The scope of the present disclosure should include modifications that those skilled in the art can obtain by adding various design changes to the exemplary embodiments described above, as well as modifications implemented by freely combining components and functions described in the exemplary embodiments without deviating from the gist of the present disclosure.

Conclusions

Direct current short circuit protection device 1 according to a first aspect of the present disclosure includes active type fuse 10 that includes bus bar 12 and cuts off bus bar 12 according to ignition signal S3, current detector 13*a* that includes resistor 131*a* and detects a current flowing through bus bar 12, current detector 13*b* that includes resistor 131*b* and detects the current flowing through bus bar 12, and disconnection control circuit 20 that outputs ignition signal S3 to active type fuse 10 based on detection signal S1 output from current detector 13*a* and detection signal S2 output from current detector 13*b*, wherein resistor 131*a* and resistor 131*b* are integrated with bus bar 12 such that a current having the same magnitude as the current flowing through bus bar 12 flows, and the resistance value of resistor 131*a* and the resistance value of resistor 131*a* are different values.

With this configuration, erroneous disconnection due to the influence of the inductance component can be suppressed.

In direct current short circuit protection device 1 according to a second aspect of the present disclosure, disconnection control circuit 20 determines whether to cut off bus bar 12 by performing a predetermined calculation based on detection signal S1 output from current detector 13*a* and detection signal S2 output from current detector 13*b*, and outputs ignition signal S3 to active type fuse 10 when disconnection control circuit 20 has determined to cut off bus bar 12.

With this configuration, erroneous disconnection due to the influence of the inductance component can be suppressed.

In direct current short circuit protection device 1 according to a third aspect of the present disclosure, the predetermined calculation includes a calculation of dividing a difference between detection signal S1 output from current detector 13*a* and detection signal S2 output from current detector 13*b* by a difference between the resistance value of resistor 131*a* and the resistance value of resistor 131*b*.

With this configuration, erroneous disconnection due to the influence of the inductance component can be suppressed.

In direct current short circuit protection device 1 according to a fourth aspect of the present disclosure, resistor 131*a* and resistor 131*b* are parts of the bus bar 12, a direction in which a current flowing through resistor 131*a*, resistor 131*b*, and bus bar 12 is defined as a first direction, and an area of a section of resistor 131*a* orthogonal to the first direction (for example, area of B-B' section in FIG. 8) and an area of a section of resistor 131*b* orthogonal to the first direction (for example, area of D-D' section in FIG. 8) are smaller than an area of a section in a portion other than resistor 131*a* and resistor 131*b* in bus bar orthogonal to the first direction (for example, area of A-A' section and area of C-C' section in FIG. 8).

With this configuration, a current monitoring terminal is connected to both ends of the portion having a reduced sectional area so that the voltage generated by a current flowing through the portion can be acquired via the current monitoring terminal, whereby the portion can be used as a current detector.

In direct current short circuit protection device 1 according to a fifth aspect of the present disclosure, the area of the section of resistor 131*a* orthogonal to the first direction (for example, area of a B-B' section in FIG. 8) is different from the area of the section of resistor 131*b* orthogonal to the first direction (for example, area of D-D' section in FIG. 8).

With this configuration, a current monitoring terminal is connected to both ends of the portion having a reduced sectional area so that the voltage generated by a current flowing through the portion can be acquired via the current monitoring terminal, whereby the portion can be used as a current detector.

In direct current short circuit protection device 1 according to a sixth aspect of the present disclosure, current detector 13*a* includes current monitoring terminals 132*a* and 133*a* for monitoring the current flowing through resistor 131*a*, and current detector 13*b* includes current monitoring terminals 132*b* and 133*b* for monitoring the current flowing through resistor 131*b*.

With this configuration, the voltages generated in resistor 131*a* and resistor 131*b* can be output as detection signal S1 and detection signal S2 from current detector 13*a* and current detector 13*b*, respectively.

Direct current short circuit protection device 1 according to a seventh aspect of the present disclosure further includes a temperature monitoring terminal that is provided on bus bar 12 and monitors a temperature of bus bar 12.

With this configuration, the temperature of bus bar 12 can be monitored, and the temperature of bus bar 12 can be used for calculating the current value.

Direct current short circuit protection device 1 according to an eight aspect of the present disclosure further includes comparator 23 that compares a first current value calculated based on detection signal S1 output from current detector 13*a* with a second current value calculated based on a detection signal output from current detector 13*b*, and comparator 23 detects that any one of current detector 13*a* and current detector 13*b* has failed based on a comparison result between the first current value and the second current value.

With this configuration, when the first current value and the second current value are different from each other, it can be determined that either one of current detector 13*a* and current detector 13*b* has failed.

INDUSTRIAL APPLICABILITY

The present disclosure can be applied to a device that disconnects a current flowing through a current path.

REFERENCE MARKS IN THE DRAWINGS

1: direct current short circuit protection device
10: active type fuse
11: cutter
11*a*: ignition terminal
11*b*, 11*c*, 11*d*: cutting blade
12: bus bar
12*a*, 12*b*: fastener part
13*a*, 13*b*, 13*c*: current detector
20: disconnection control circuit
21: detection signal acquisition unit
22: disconnection determination unit
23: comparator
24: ignition control circuit
121: cut portion
131*a*, 131*b*, 131*c*: resistor
132*a*, 133*a*, 132*b*, 133*b*: current monitoring terminal
140: temperature monitoring terminal
S1, S2: detection signal
S3: ignition signal

The invention claimed is:

1. A direct current short circuit protection device comprising:

a fuse that includes a bus bar and cuts off the bus bar in response to an ignition signal;

a first current detector that includes a first resistor and detects a current flowing through the bus bar;

a second current detector that includes a second resistor and detects the current flowing through the bus bar; and a disconnection control circuit that outputs the ignition signal to the fuse based on a first detection signal output from the first current detector and a second detection signal output from the second current detector, wherein the first resistor and the second resistor are integrated with the bus bar, and a current having a same magnitude as the current flowing through the bus bar flows in the first resistor and the second resistor, the first resistor and second resistor have resistance values different from each other, the disconnection control circuit determines whether to cut off the bus bar by performing a predetermined calculation based on the first detection signal output from the first current detector and the second detection signal output from the second current detector, and the disconnection control circuit outputs the ignition signal to the fuse when the disconnection control circuit has determined to cut off the bus bar.

2. The direct current short circuit protection device according to claim 1, wherein the predetermined calculation includes a calculation of dividing a difference between the first detection signal output from the first current detector and the second detection signal output from the second current detector by a difference between a resistance value of the first resistor and a resistance value of the second resistor.

3. A direct current short circuit protection device comprising:

a fuse that includes a bus bar and cuts off the bus bar in response to an ignition signal;

a first current detector that includes a first resistor and detects a current flowing through the bus bar;

a second current detector that includes a second resistor and detects the current flowing through the bus bar; and a disconnection control circuit that outputs the ignition signal to the fuse based on a first detection signal output from the first current detector and a second detection signal output from the second current detector, wherein the first resistor and the second resistor are integrated with the bus bar, and a current having a same magnitude as the current flowing through the bus bar flows in the first resistor and the second resistor, the first resistor and second resistor have resistance values different from each other, the first resistor and the second resistor are parts of the bus bar, a direction in which the current flowing through the first resistor, the second resistor, and the bus bar is defined as a first direction, and an area of a section of the first resistor orthogonal to the first direction and an area of a section of the second resistor orthogonal to the first direction are smaller than an area of a section in a portion other than the first resistor and the second resistor in the bus bar orthogonal to the first direction.

4. The direct current short circuit protection device according to claim 3, wherein the area of the section of the first resistor orthogonal to the first direction and the area of the section of the second resistor orthogonal to the first direction are different from each other.

5. A direct current short circuit protection device comprising:

a fuse that includes a bus bar and cuts off the bus bar in response to an ignition signal:

a first current detector that includes a first resistor and detects a current flowing through the bus bar;

a second current detector that includes a second resistor and detects the current flowing through the bus bar; and a disconnection control circuit that outputs the ignition signal to the fuse based on a first detection signal output from the first current detector and a second detection signal output from the second current detector, wherein the first resistor and the second resistor are integrated with the bus bar, and a current having a same magnitude as the current flowing through the bus bar flows in the first resistor and the second resistor, the first resistor and second resistor have resistance values different from each other, the first current detector includes a current monitoring terminal for monitoring a current flowing through the first resistor, and the second current detector includes a current monitoring terminal for monitoring a current flowing through the second resistor.

6. A direct current short circuit protection device comprising:

a fuse that includes a bus bar and cuts off the bus bar in response to an ignition signal;

a first current detector that includes a first resistor and detects a current flowing through the bus bar;

a second current detector that includes a second resistor and detects the current flowing through the bus bar;

a disconnection control circuit that outputs the ignition signal to the fuse based on a first detection signal output from the first current detector and a second detection signal output from the second current detector; and a temperature monitoring terminal that is provided on the bus bar and monitors a temperature of the bus bar, wherein the first resistor and the second resistor are integrated with the bus bar, and a current having a same magnitude as the current flowing through the bus bar flows in the first resistor and the second resistor, and the first resistor and second resistor have resistance values different from each other.

7. A direct current short circuit protection device comprising:

a fuse that includes a bus bar and cuts off the bus bar in response to an ignition signal;

a first current detector that includes a first resistor and detects a current flowing through the bus bar;

a second current detector that includes a second resistor and detects the current flowing through the bus bar;

a disconnection control circuit that outputs the ignition signal to the fuse based on a first detection signal output from the first current detector and a second detection signal output from the second current detector; and a comparator that compares a first current value calculated based on the first detection signal output from the first current detector with a second current value calculated based on the second detection signal output from the second current detector, wherein the comparator detects that any one of the first current detector and the second current detector has failed based on a comparison result between the first current value and the second current value, the first resistor and the second resistor are integrated with the bus bar, and a current having a same magnitude as the current flowing through the bus bar flows in the first resistor and the second resistor, and the first resistor and second resistor have resistance values different from each other.

8. The direct current short circuit protection device according to claim 3, wherein the disconnection control circuit determines whether to cut off the bus bar by performing a predetermined calculation based on the first detection signal output from the first current detector and the second detection signal output from the second current detector, and the disconnection control circuit outputs the ignition signal to the fuse when the disconnection control circuit has determined to cut off the bus bar.

9. The direct current short circuit protection device according to claim 8, wherein the predetermined calculation includes a calculation of dividing a difference between the first detection signal output from the first current detector and the second detection signal output from the second current detector by a difference between a resistance value of the first resistor and a resistance value of the second resistor.

10. The direct current short circuit protection device according to claim 3, wherein the first current detector includes a current monitoring terminal for monitoring a current flowing through the first resistor, and the second current detector includes a current monitoring terminal for monitoring a current flowing through the second resistor.

11. The direct current short circuit protection device according to claim 3, further comprising a temperature monitoring terminal that is provided on the bus bar and monitors a temperature of the bus bar.

12. The direct current short circuit protection device according to claim 3, further comprising a comparator that compares a first current value calculated based on the first detection signal output from the first current detector with a second current value calculated based on the second detection signal output from the second current detector, wherein the comparator detects that any one of the first current detector and the second current detector has failed based on a comparison result between the first current value and the second current value.

13. The direct current short circuit protection device according to claim 5, wherein the disconnection control circuit determines whether to cut off the bus bar by performing a predetermined calculation based on the first detection signal output from the first current detector and the second detection signal output from the second current detector, and the disconnection control circuit outputs the ignition signal to the fuse when the disconnection control circuit has determined to cut off the bus bar.

14. The direct current short circuit protection device according to claim 13, wherein the predetermined calculation includes a calculation of dividing a difference between the first detection signal output from the first current detector and the second detection signal output from the second current detector by a difference between a resistance value of the first resistor and a resistance value of the second resistor.

15. The direct current short circuit protection device according to claim 5, further comprising a comparator that compares a first current value calculated based on the first detection signal output from the first current detector with a second current value calculated based on the second detection signal output from the second current detector, wherein the comparator detects that any one of the first current detector and the second current detector has failed based on a comparison result between the first current value and the second current value.

16. The direct current short circuit protection device according to claim 6, wherein the disconnection control circuit determines whether to cut off the bus bar by performing a predetermined calculation based on the first detection signal output from the first current detector and the second detection signal output from the second current detector, and the disconnection control circuit outputs the ignition signal to the fuse when the disconnection control circuit has determined to cut off the bus bar.

17. The direct current short circuit protection device according to claim 6, further comprising a comparator that compares a first current value calculated based on the first detection signal output from the first current detector with a second current value calculated based on the second detection signal output from the second current detector, wherein the comparator detects that any one of the first current detector and the second current detector has failed based on a comparison result between the first current value and the second current value.

18. The direct current short circuit protection device according to claim 7, wherein the disconnection control circuit determines whether to cut off the bus bar by performing a predetermined calculation based on the first detection signal output from the first current detector and the second detection signal output from the second current detector, and the disconnection control circuit outputs the ignition signal to the fuse when the disconnection control circuit has determined to cut off the bus bar.

19. The direct current short circuit protection device according to claim 18, wherein the predetermined calculation includes a calculation of dividing a difference between the first detection signal output from the first current detector and the second detection signal output from the second current detector by a difference between a resistance value of the first resistor and a resistance value of the second resistor.

20. The direct current short circuit protection device according to claim 7, wherein the first resistor and the second resistor are parts of the bus bar, a direction in which the current flowing through the first resistor, the second resistor, and the bus bar is defined as a first direction, an area of a section of the first resistor orthogonal to the first direction and an area of a section of the second resistor orthogonal to the first direction are smaller than an area of a section in a portion other than the first resistor and the second resistor in the bus bar orthogonal to the first direction, and the area of the section of the first resistor orthogonal to the first direction and the area of the section of the second resistor orthogonal to the first direction are different from each other.

* * * * *